June 14, 1955            H. E. HULL            2,710,501
METHOD AND APPARATUS FOR PRODUCING SAW BLADES
Filed Nov. 8, 1949            3 Sheets-Sheet 1
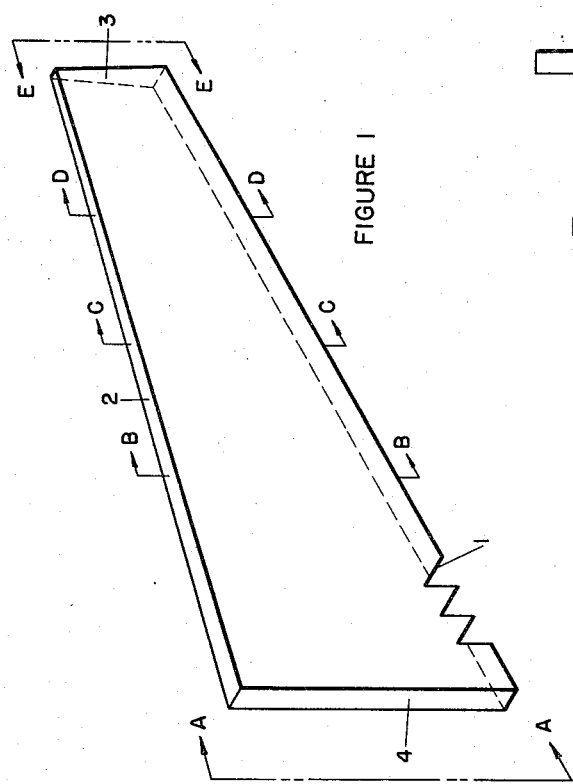
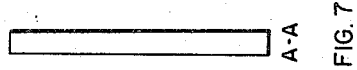
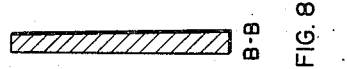
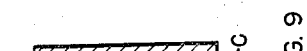
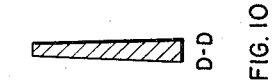
*INVENTOR.*
Henry E. Hull
BY
*AGENTS.*

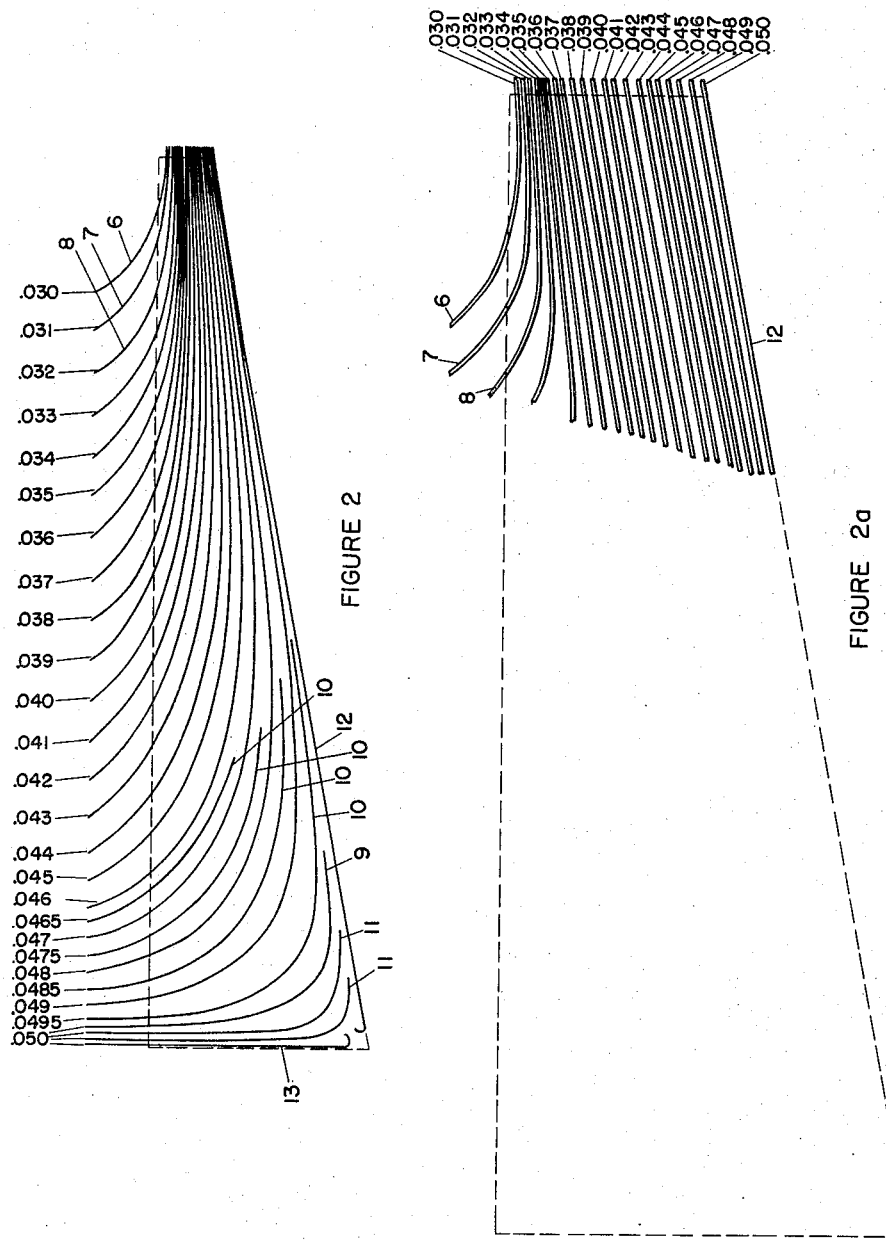

June 14, 1955

H. E. HULL 2,710,501

METHOD AND APPARATUS FOR PRODUCING SAW BLADES

Filed Nov. 8, 1949

*INVENTOR.*
Henry E. Hull

BY

*AGENTS.*

United States Patent Office 2,710,501
Patented June 14, 1955

2,710,501

METHOD AND APPARATUS FOR PRODUCING SAW BLADES

Henry E. Hull, Worthington, Ohio, assignor, by mesne assignments, to Rockwell Manufacturing Co., a corporation of Pennsylvania Application November 8, 1949, Serial No. 126,161

10 Claims. (Cl. 51—281)

This invention pertains to a method and an apparatus for producing a saw blade. For illustrative purposes, the invention will be hereinafter described in connection with a hand saw blade and a method and an apparatus for producing the same, although the invention is obviously not limited thereto.

It is highly desirable in a hand saw blade that such blade have a compound taper so that the saw blade will not bind in the kerf being cut. More specifically, it is highly desirable that the blade should taper from the nose toward the butt end of the blade and should also taper from the tooth edge of the blade to the topmost edge thereof, the tooth edge of the blade being of the same thickness throughout its length. In other words, the saw blade, while having a tooth edge which is of the same thickness throughout its length, will have a body portion that is thinnest at the top edge of the nose end, becoming gradually thicker towards the tooth edge and becoming progressively thicker from the nose end towards the butt end, both longitudinally and vertically, of the blade.

Heretofore, the production of such a compound taper on a hand saw blade has been more or less of a hit-and-miss proposition. In usual practice, a template is laboriously made by hand, such template being ground to at least simulate a compound taper, a saw blade blank is laid upon the template, and the saw blade blank and template together are moved back and forth manually across the surface of a grinding stone or wheel with variant pressures being exerted on the saw blade blank and template by a roller beneath the template. The amount of stock ground from the saw blade blank has been dependent upon the human element in that the operator manually varies the amount of pressure exerted on the saw blade blank and template by the roller. This results in considerable variation in thickness and taper of the saw blade blank, and in most instances the sides of the saw blade made in such manner are curved or barrel-shaped from the tooth edge of the blank to the top thereof.

Other methods have been attempted in an effort to produce saw blade blanks in which the degree of tolerance, or variation of the blades from the optimum may be closely controlled. For example, it has been attempted to cast the saw blade templates in one instance, and in another instance there have been made what is known as "flux plates" for use on an automatic mechanical grinder, such flux plates including a metal block having the desired contour laboriously formed as closely as practicable thereon, and having disposed therein a plurality of magnetic areas for cooperation with the bed of a magnetic chuck.

It is one object of this invention to provide a method and an apparatus for producing a saw blade, in which the apparatus and method is such that the blade produced from the template will have a compound taper in two directions.

It is another object of this invention to provide a method and an apparatus for producing a saw blade in which the degree of the taper and the amount of stock removed from the saw blank by a grinding operation may be determined mechanically rather than manually.

It is another object of this invention to provide a template for producing saw blades which will permit the production of a plurality of blades mechanically and in multiple rather than one blade at a time, and in which the blades produced will have a tolerance variation within extremely close limits.

A further object of this invention is to provide an apparatus for producing a saw blade which is simple in construction, easy to manipulate, and lends itself to the production of a saw blade in which sections taken vertically through the transverse width of the saw blade, and from the tooth edge to the top edge of the blade, are true isosceles trapezoids.

Various other objects and advantageous features of the invention may be had from the following description when taken in conjunction with the accompanying drawings wherein similar characters of reference designate corresponding parts, and wherein:

Figure 1 is a perspective view of a hand saw blade having the features of and produced in accordance with the ideas disclosed by this invention.

Figure 2 is a plan view showing a portion of the apparatus for generating a compound taper on a saw blade, or on a saw blade template from which a plurality of saw blades may be produced.

Figure 2–a is a fragmentary view similar to Figure 2, but on an enlarged scale.

Figure 3:
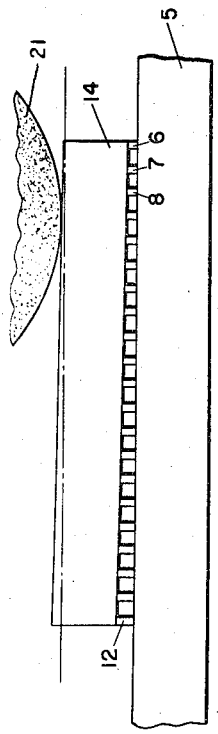

Figure 3 is a view showing the initial grinding step utilized in producing a master template from which other templates may be produced, or saw blades ground to shape.

Figure 4:
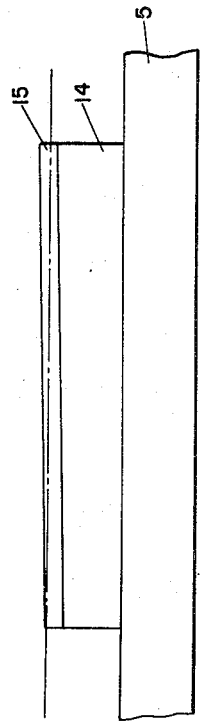

Figure 4 is a view similar to Figure 3, but showing the second step in producing the master template.

Figure 5:
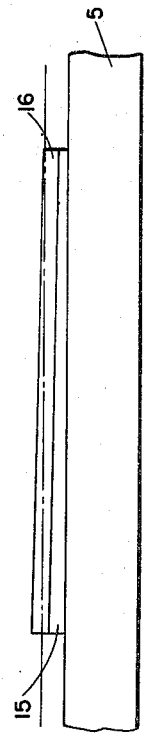

Figure 5 is a view similar to Figure 4 and showing the third and final step in producing a master template.

Figure 6:
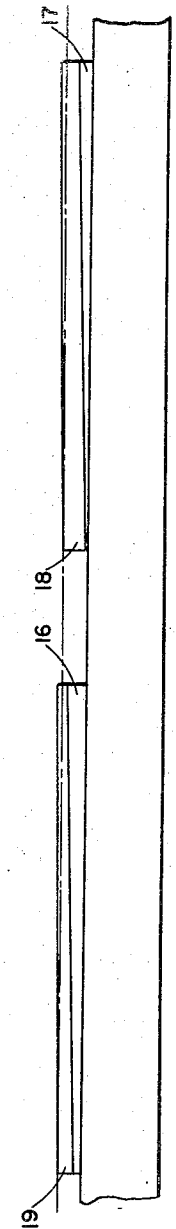

Figure 6 is a view showing the grinding operation on a saw blade blank, utilizing a master template as produced by the various grinding operations shown in Figures 3, 4, and 5, or utilizing templates made from master templates produced by such grinding operations.

Figure 7 is a view taken on line A—A of Figure 1.
Figure 8 is a view taken on the line B—B of Figure 1.
Figure 9 is a view taken on the line C—C of Figure 1.
Figure 10 is a view taken on the line D—D of Figure 1.
Figure 11 is a view taken on the line E—E of Figure 1.

Referring to Figure 1, there is shown a hand saw blade, produced in accordance with the ideas disclosed by this invention, which includes a toothed edge 1, a top edge 2, a nose end 3, and a butt end 4. The butt end 4 is higher than the nose end 3, whereby the top edge 2 angles from the butt end towards the nose end, the toothed edge 1 being straight so that the saw blade, when viewed from the side, is generally in the form of a trapezoid.

The toothed edge 1 remains the same thickness from the butt end 4 to the nose end 3, while the nose end 3 tapers upwardly from the toothed edge in the general form of an isosceles trapezoid. The top edge 2 tapers toward the nose end 3 from the butt end 4, the butt end 4 being of the same thickness throughout its height and in the form generally of a rectangle.

Referring to Figures 2 to 5, inclusive, there is illustrated the apparatus and the method of this invention by which a saw blade, having the characteristics and general configuration of the saw blade shown in Figure 1, may be produced, or by which a master template from which successive saw blades as shown in Figure 1 may be produced, or from which master templates or other templates may be produced whereby saw blades may be produced from each of the latter templates individually or from a plurality of the latter templates collectively. Referring to Figures 3, 4, and 5, the numeral 5 represents the bed of a magnetic chuck, and to which metal having the proper characteristics may be clamped by magnetic action. Such chucks are well known in the art.

In accordance with the present invention, and as shown in Figures 2 and 3, there is provided a plurality of flat strips, preferably of some nonmagnetic material such as copper or other metals, ceramics, plastics, etc., and each of such strips is curved on a gradually increasing radius. Likewise, such strips vary progressively in thickness in predetermined increasing amounts. For example, the strip 6 (Figure 2) may have a thickness of .030 inch throughout its length, the strip 7 next adjacent thereto may have a thickness of .031 inch, the strip 8 next adjacent strip 7 may have a thickness of .032 inch, and so on progressively to the strip 9, which may, for example, have a thickness of .050 inch. If generated further in length, the strips would form, generally, segments of hyperbolas, and the curve of each strip is generated on a progressively increasing radius in such manner that the strips, when arranged in the manner shown in Figure 2, will bisect what is to be the top edge of the saw blade template, or saw blade, in spaced distances from each other, say, for example, ¼ of an inch. While it is not a requirement, it may be found desirable, particularly as the strips approach the butt end of the saw, to place additional strips which increase by half-thousandths between the adjacent strips which are graduated in thousandths. For example, as shown in Figure 2, strips 10 which are .0465, .0475, .0485, and .0495 are placed between the respective pairs of strips formed by those having a thickness of .0460, .0470, .0480, .0490, and .0500, respectively. As also shown in this figure, as the strips approach the butt end of the saw, they make the form of short contoured strips 11, all of which are the same thickness as the butt end 4 of the saw, for example, .050 inch. The number and shape of these strips is dependent on the shape of the saw and whether or not it is desirable to have an area of the same thickness at the butt end of the saw for handle-attaching purposes. A strip 12 of, for example, .050 inch throughout its length forms the bottom one of the strips to thereby provide a tooth edge of like thickness throughout, and a strip 13 of, say, .050 inch in thickness forms the end one of the strips to determine the thickness of the extreme butt end of the saw.

In the use of this apparatus, let it be assumed that the sheet bearing Figure 2 represents the surface of the magnetic chuck 5. A figure, generally representing the shape of the saw blade or template to be made, is marked on the surface of the chuck as, for example, by chalk or other means. A strip 12, representing the thickness to be ground on the tooth edge of the saw blank or some constant minus the thickness of the edge of the template from which the saw blanks are to be made, is first placed along the bottom of the figure, and then successive strips are laid in sequence with their substantially straight legs parallel along what is to be the nose of the saw, such strips being laid in accordance with their thickness so that there will be a progressive decrease in thickness from the strip 12, representing the tooth edge, to the strip 6 representing the top of the nose end of the saw, and which strip 6 is, for example, .030 inch in thickness. Then, a strip 13, which determines the thickness of the extreme butt end of the saw, is laid and, if desired, intermediate strips 10, representing .0005 inch variation in thickness, are positioned as hereinbefore described, and also, if desired, strips 11, of the same thickness, are positioned, as described.

A relatively thick plate 14 of the general contour of the saw blade or template to be made is then laid upon the assembled strips as shown in Figure 3, this plate being clamped and held on to the strips by the magnetic action of the chuck. The magnetic pull of the chuck serves to pull the plate 14 down on to the strips hereinbefore described so that the upper surface of the plate 14 is warped by such pull to follow the contour of the surface defined by the upper surfaces of the strips. After this is accomplished, a grinding wheel 21, a portion of which is shown in Fig. 3, and which may move back and forth across the magnetic chuck automatically and may or may not be manually or automatically adjustable to vary the depth of cut, is passed back and forth across the plate 14 to grind off the desired amount of such plate. Such grinding will result in that edge of the plate 14 resting on the smallest strip thickness being the thickest part of the plate, and that part of the plate resting upon the strip of greatest thickness being the thinnest part of the plate, and will result in a surface which is the converse of the surface defined by the uppermost surfaces of the strips hereinbefore described.

Having once reproduced the converse of the surface defined by the upper surfaces of the strips in the manner just described, the pull of the magnetic chuck is released and the strips are removed therefrom. Then, the plate 14 is positioned on the magnetic chuck 5, as shown in Figure 4, so that the flat and unground surface of the plate 14 rests upon the surface of the chuck and the contoured surface just previously ground is uppermost. Then, a thinner plate 15, which more nearly represents the ultimate thickness of the saw blade or the saw template to be produced, is placed upon the thicker plate 14 and the entire assembly is clamped on the magnetic chuck by magnetic pull. Since the thicker edge of the plate 14 is to the right, the grinding wheel which moves in a straight line parallel to the surface of the magnetic chuck will take a greater cut from the right-hand end of the plate 15 than at the left-hand end thereof, resulting in a plate having one flat surface and the uppermost surface thereof contoured in exact replication of the surface defined by the uppermost surfaces of the strips hereinbefore described.

It is to be understood that, while not absolutely necessary, a relatively thick plate 14 is utilized in the first operation in connection with the strips, to avoid possibility of the plate being drawn downwardly between the strips, to thereby adversely affect the contour of the upper surface upon being ground.

Following grinding of the plate 15 in the manner hereinbefore described, the assembly of the plates 14 and 15 are released from the magnetic chuck, the plate 14 removed and the plate 15 placed with its flat surface on the magnetic chuck and its contoured surface uppermost as is shown in Figure 5. As also shown in Figure 5, the plate 15 is positioned so that the lightest cut on the plate 16, which has been placed thereon and clamped therewith to the magnetic chuck, is taken on the right-hand edge of the plate 16, and the heavier cut taken on the left-hand edge. Grinding of the plate 16, which has been clamped to the contoured surface of the plate 15, results in the plate 16 having an upper contoured surface which is the converse of the upper surface of the plate 15, or an exact replication of the upper surface of the plate 14, and, in turn, the upper surface of the plate 15 is an exact replication of the surface defined by the upper surfaces of the strips. The plate 15 is thus a master saw blank utilized for grinding template 16 to produce saw blades.

It may be found desirable to provide two master saw blanks for the forming of a pair of templates, used simultaneously in producing saw blades, and by the use of which templates an equal amount of material may be ground from both sides of the saw blades. These templates may be formed in the manner just described, the difference lying in the fact that, as shown in Figure 6, first operation template 17 has less taper and is thinner than second operation or finishing template 16, hence substantially identical wedges of material are removed from rough blank 18 and semi-finished blank 19 which has been turned over to receive a finishing cut on the other side thereof.

With this invention, numerous advantages are obtained. Templates may be made with comparative ease and in such manner that tolerance variation may be held to a minimum. The invention has the further advantage that the template and saw blank made therefrom are accurately and correctly provided with a compound taper and, being rigidly held, are not subject to variations inherent by reason of the use of other methods. A further advantage arises from the fact that the tooth edge of a saw blade formed by this method will be of the same thickness throughout its length.

As illustrated in Figures 7 to 11, inclusive, which represent sections taken vertically through a saw blade from the tooth edge 1 upwardly to the top edge 2, the butt end 4 of the plate as represented in Figure 7 represents a true rectangle whereas any other section taken on parallel planes through the saw blade will result in true isosceles trapezoids as illustrated in Figures 8 to 11, inclusive. As shown by these figures, the sides of the saw blade are not curved or barrel-shaped. Numerous other novel and advantageous features will be apparent.

What is claimed is:

1. Apparatus for producing a template for grinding saw blades comprising, in combination with a flat surface magnetic chuck, strips, each of which strips is in the form of a segment of a hyperbola parallel to the plane of and contacting the surface of said chuck and of progressively increasing thickness as measured perpendicular to the surface of said chuck, from the thinnest strip to the thickest strip, and each of which segments has a smaller radius of curvature progressively from the thinnest to the thickest strip.

2. Apparatus for producing a saw blade template, and by which template saw blade blanks are formed, including a flat surface magnetic chuck, and a plurality of strips, each of said strips being in substantially the form of a segment of a hyperbola parallel to the plane of and contacting the surface of said chuck and of progressively increasing thickness, as measured perpendicular to the surface of said chuck, one over the other, and each of said segments having a progressively increasing radius of curvature one over the other from the segment having the least radius of curvature to the segment having the greatest radius of curvature, disposed on a flat surface of the magnetic chuck.

3. Apparatus for producing a saw blade template, including in combination, a flat surface magnetic chuck, a plurality of flat strips each of which is a segment of a hyperbola, and each of which segments has a progressively greater radius of curvature, arranged on said flat surface in side-by-side relation in the plane of said hyperbolas from the segment having the smallest radius of curvature to the segment having the greatest radius of curvature, whereby to provide a curved surface tapered in two directions.

4. Apparatus for producing a saw blade template by grinding, which comprises, in combination with a flat surface magnetic chuck, a plurality of flat strips, each shaped to extend along the template to be produced for a portion of its length and then curving toward one of the edges of the template, and each varying in thickness, as measured perpendicular to the surface of said chuck, from the next succeeding strip by a predetermined amount, disposed in side-by-side relation on the flat surface of said magnetic chuck, a template plate clamped thereon by the magnetic pull of the chuck, and a grinding element movable across such plate in a straight line to provide a resulting ground surface of the template comprising the converse of the surface defined by the upper surfaces of said strips.

5. Apparatus for producing saw blades and saw-blade templates comprising, in combination, a flat surface magnetic chuck and a plurality of strips, each of which strips is in the form of a segment of a hyperbola, such segments being of progressively increased thickness as measured perpendicular to the plane of said hyperbola and having a progressively smaller radius of curvature from the thinnest to the thickest strip, said strips being assembled progressively from thinnest to thickest in side-by-side relation on the flat surface of the magnetic chuck, with the plane of each hyperbola parallel to the plane of said surface, and contacting said surface, the opposite sides of the strips defining a curved surface that angles outwardly from the flat surface of the chuck in two directions.

6. Apparatus for producing saw blades and saw-blade templates by grinding, comprising, in combination with a flat surface magnetic chuck, a plate having a flat surface and an opposite compound tapered and curved surface, said flat surface of said plate being positioned on the flat surface of said magnetic chuck, whereby a work plate may be clamped on said compound tapered and curved surface by the magnetic pull of the chuck in such manner as to conform said work plate to said last mentioned surface, and a grinding element movable across said work plate in a plane parallel to the flat surface of said chuck to provide a ground surface of said work plate comprising the converse of said compound tapered and curved surface of said first-mentioned plate upon the unclamping of said work plate.

7. A method of producing a compound tapered and curved surface on saw blades and saw-blade templates, comprising magnetically clamping a deformable substantially plane-surfaced plate on a compound tapered and curved surface in such manner as to conform said plate to said surface, and passing a grinding element in a straight line over the exposed surface of said plate in such manner as to grind along the locus of a plane, whereby the ground surface of said plate will assume the converse of said compound tapered and curved surface when released from said magnetic clamping.

8. The method of producing a compound taper on a saw blade which comprises placing and arranging a plurality of strips on a flat surface to define a compound tapered and curved surface, said strips so selected as to be of progressively increasing thickness as measured perpendicular to said flat surface from the first strip to the last strip, clamping a plate on the surface defined by the said strips and then passing a grinding wheel over the exposed surface of such plate whereby the ground surface of the plate will assume the converse of the surface defined by the strips when released from said clamping.

9. The method of producing a compound taper on a saw blade which comprises placing and arranging a plurality of strips on a flat surface to define a compound tapered and curved surface, said strips so selected as to be of progressively increasing thickness as measured perpendicular to said flat surface from the first strip to the last strip, clamping a substantially flat surface plate on the surface defined by the said strips in such manner as to conform said plate to said curved surface, and then passing a grinding wheel in a straight line over the exposed surface of such plate whereby the ground surface of the plate will assume the converse of the surface defined by the strips when released from said clamping.

10. The method of producing a compound taper on a saw blade which comprises placing and arranging a plurality of strips on a flat surface to define a compound tapered and curved surface, said strips selected so as to be of progressively increasing thickness as measured perpendicular to said flat surface, from the first strip to the last strip, clamping a substantially plane surfaced plate on the surface defined by the said strips, and then passing a grinding wheel in a straight line over the exposed surface of such plate, whereby the ground surface of the plate will assume the converse of the surface defined by the strips when released from said clamping and utilizing such ground plate as a template for similarly grinding the surfaces of saw blade blanks.

References Cited in the file of this patent

UNITED STATES PATENTS

| | | |
|---|---|---|
| 106,071 | Mefford | Aug. 2, 1870 |
| 181,650 | Disston | Aug. 29, 1876 |
| 269,729 | Simonds | Dec. 26, 1882 |
| 346,565 | Simonds | Aug. 3, 1886 |
| 440,253 | Prouty | Nov. 11, 1890 |
| 643,914 | Shaw | Feb. 20, 1900 |
| 1,133,476 | Hyde et al. | Mar. 30, 1915 |
| 1,171,818 | Walpone | Feb. 15, 1916 |
| 1,654,000 | Hirst | Dec. 27, 1927 |
| 2,104,472 | St. Clair et al. | Jan. 4, 1938 |
| 2,113,874 | Chanik | Apr. 12, 1938 |
| 2,390,978 | Woodbury | Dec. 11, 1945 |
| 2,424,835 | Luckey | July 29, 1947 |

FOREIGN PATENTS

| | | |
|---|---|---|
| 107,229 | Great Britain | June 18, 1917 |
| 204,310 | Switzerland | Aug. 1, 1939 |
| 533,646 | Germany | Sept. 18, 1931 |
| 561,561 | Great Britain | May 24, 1944 |